(12) United States Patent
Baasch et al.

(10) Patent No.: US 8,944,231 B2
(45) Date of Patent: Feb. 3, 2015

(54) DEVICE FOR CHANGING AN OPERATIONAL STATUS OF A SHIFTING ELEMENT WITH TWO SHIFTING ELEMENT HALVES

(75) Inventors: Detlef Baasch, Friedrichshafen (DE); Ulrich Mair, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 415 days.

(21) Appl. No.: 13/430,782

(22) Filed: Mar. 27, 2012

(65) Prior Publication Data
US 2012/0255828 A1 Oct. 11, 2012

(30) Foreign Application Priority Data
Apr. 7, 2011 (DE) .................. 10 2011 006 965

(51) Int. Cl.
*F16D 13/48* (2006.01)
*F16D 13/54* (2006.01)
*F16D 28/00* (2006.01)
(Continued)

(52) U.S. Cl.
CPC ............ *F16D 28/00* (2013.01); *F16H 63/3043* (2013.01); *F16D 27/004* (2013.01); *F16D 2023/123* (2013.01); *F16H 2063/3056* (2013.01)
USPC ...................... 192/93 A; 192/54.52; 192/84.6; 192/84.7; 192/70.23; 192/109 A

(58) Field of Classification Search
CPC ..... F16D 13/48; F16D 13/54; F16D 2121/24; F16D 2125/34; F16D 2125/36
USPC .......................... 192/93 A, 84.7, 70.23, 109 A
See application file for complete search history.

(56) References Cited

U.S. PATENT DOCUMENTS 5,934,433 A 8/1999 Leimbach et al.
6,742,642 B1 * 6/2004 Stevenson et al. ......... 192/54.52
(Continued)

FOREIGN PATENT DOCUMENTS

DE 43 28 889 C1 8/1994
DE 19611183 A1 9/1997
(Continued)

OTHER PUBLICATIONS

German Search Report issued in corresponding German Application 10 2011 006 965.8 issued Apr. 7, 2011.

*Primary Examiner* — David D Le
*Assistant Examiner* — Colby M Hansen
(74) *Attorney, Agent, or Firm* — Davis & Bujold, PLLC; Michael J. Bujold

(57) ABSTRACT

A mechanism for changing the operating condition of a shifting element having two shifting element halves, which can either be functionally connected to connect two components or disengaged to break the connection between the components. The mechanism includes a drive machine and a drive converter unit in the area of which rotary drive motion of the drive machine can be converted into a translational actuation movement of the shifting element. A spring device is associated with the drive converter unit, whose spring force assists with actuating the shifting element in the engaging direction. The spring device includes an approximately circular flat spring element which, in at least one area of the drive converter unit, is in contact with at least one cam, whose stress condition varies as a function of an operating condition of the drive converter unit and is designed to be rotationally fixed.

16 Claims, 2 Drawing Sheets

(51) Int. Cl.
*F16H 63/30* (2006.01)
*F16D 27/00* (2006.01)
*F16D 23/12* (2006.01)

(56) References Cited

U.S. PATENT DOCUMENTS

| | | |
|---|---|---|
| 7,543,823 B2 | 6/2009 | Buma et al. |
| 8,109,376 B2 | 2/2012 | Bek |
| 8,397,887 B2 | 3/2013 | Reisch et al. |
| 2006/0011001 A1* | 1/2006 | Showalter ........................ 74/23 |
| 2006/0254845 A1 | 11/2006 | Baasch et al. |
| 2009/0127063 A1 | 5/2009 | Ishida |

FOREIGN PATENT DOCUMENTS

| | | |
|---|---|---|
| DE | 10 2005 021 901 A1 | 11/2006 |
| DE | 60 2005 003 437 T2 | 10/2008 |
| DE | 102007023955 A1 | 11/2008 |
| DE | 102008012894 A1 | 9/2009 |
| WO | 03076827 A2 | 9/2003 |

* cited by examiner

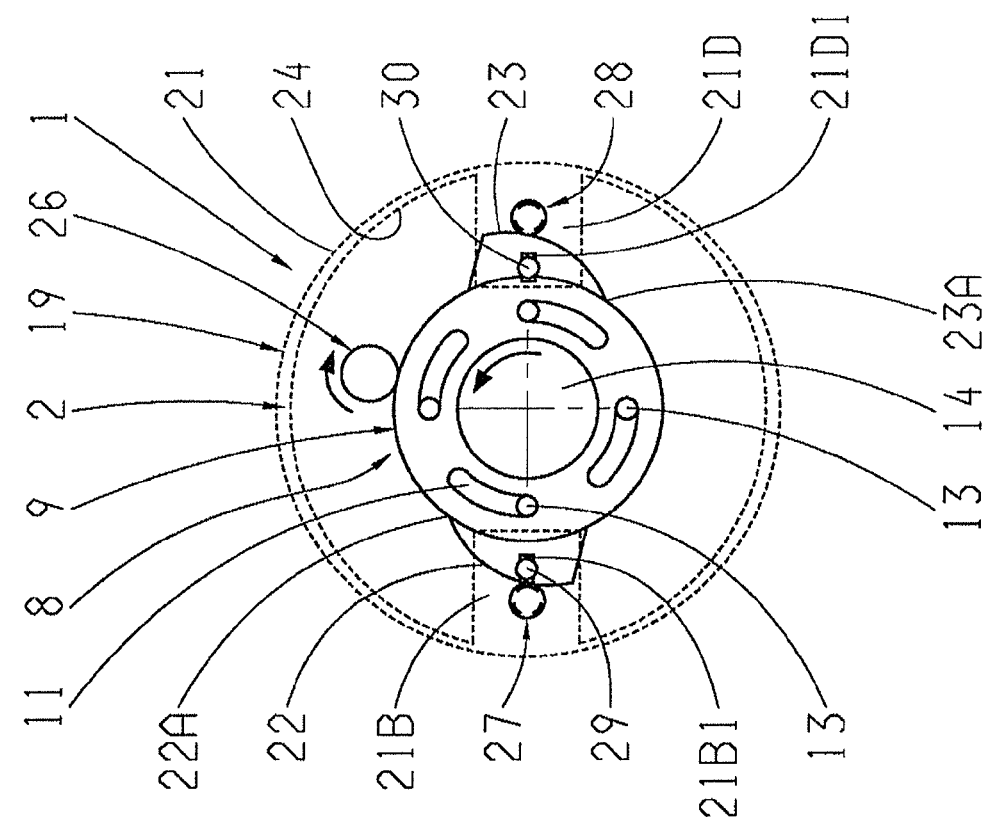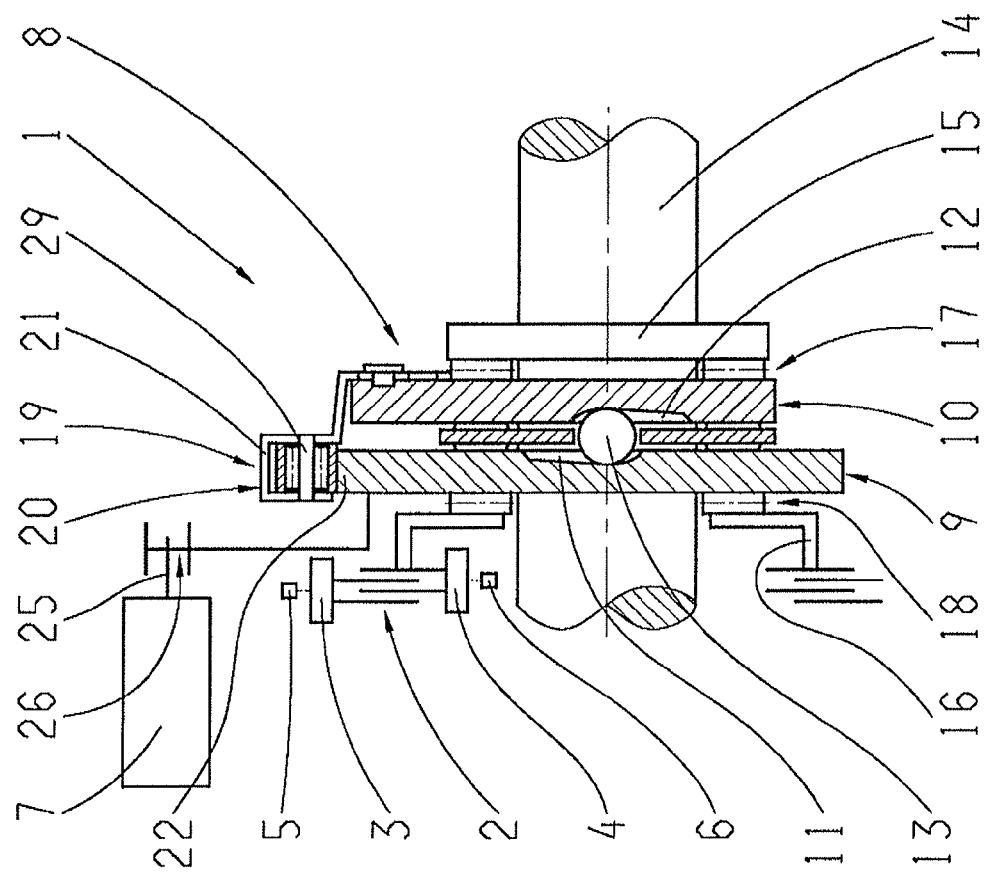

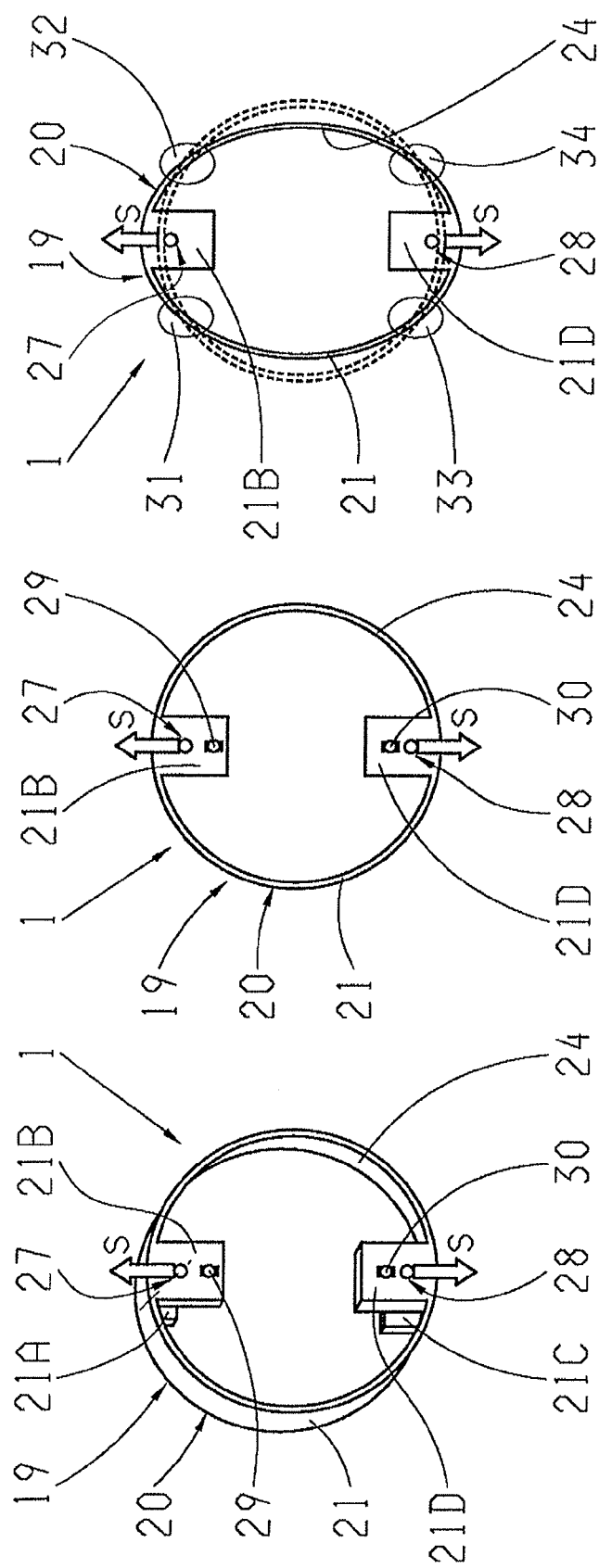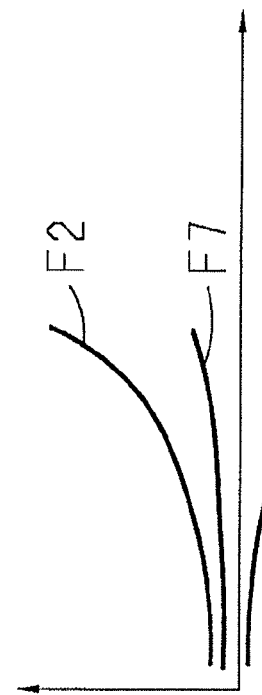

DEVICE FOR CHANGING AN OPERATIONAL STATUS OF A SHIFTING ELEMENT WITH TWO SHIFTING ELEMENT HALVES

This application claims priority from German patent application serial no. 10 2011 006 965.8 filed Apr. 7, 2011.

FIELD OF THE INVENTION

The invention concerns a device for changing an operating condition of a shifting element with two shifting element halves.

BACKGROUND OF THE INVENTION

All-wheel vehicle drive-trains are increasingly made with frictional shifting elements by means of which, in each case, drive torque produced by an internal combustion engine, which is converted in the area of a transmission connected downstream from the internal combustion engine as a function of an overall gear ratio currently engaged in the transmission in an operating-condition-dependent manner, can be distributed in varying degrees between two driven vehicle axles of the all-wheel drive-train, in order to influence the driving behavior of the all-wheel vehicle, for example to increase the driving safety.

To do this, the transmission capability of such shifting elements has to be changed with high control dynamics in an operating-condition-dependent manner. For that purpose electro-mechanical drive machines are often provided, which comprise an electric drive machine and a drive converter unit, with the drive converter unit being arranged between the drive machine and the shifting element. In the area of the drive converter unit rotational drive of the drive machine is converted into translational movement so as to actuate the shifting element.

Depending on the application concerned a transmission ratio stage is provided in the area of the drive converter unit in order to transform the rotational drive of the drive machine or the drive torque provided by the drive machine to a required level that depends on the application. For this, spur gear stages, worm gear transmissions, cam plates, spindle systems or ball-ramp systems are used as the transmission ratio stage.

By virtue of the application-dependent design of the drive converter unit and the resulting transmission ratio between the drive machine and a pressure disk of the shifting element to be actuated by the drive machine, the necessary level of actuating force to be applied to the shifting element in its closing direction for the desired function of the shifting element, and in turn the drive torque of the drive machine corresponding thereto and a resultant control dynamics, can be varied or adjusted.

The power of the drive machine is designed as a function of the desired control time or closing time of the shifting element, an air gap in the area of a frictional shifting element, the component elasticities of the frictional shifting element, the component elasticities of further structural elements present in the force flow, the inertia of the drive machine and the size of the transmission ratio between the drive machine and the shifting element to be actuated by the drive machine. In addition, for the design of the drive machine and the drive converter unit combined therewith, the wear of a shifting element that takes place over its operating life is also taken into account since enlargement of the air gap caused by wear increases the control path.

If the transmission capability of a frictional shifting element has to be set, as a function of a corresponding requirement during the operation of an all-wheel drive-train, at a torque value determined, for example specified, by a vehicle computer and then maintained at that level for longer operating times, then on the part of the drive machine a holding force has to be made permanently available. When the drive machine is made as an electric motor, then in order to maintain the level of the torque capability of the frictional shifting element, the electric motor has to be permanently energized with a sufficient current. However, such a permanent current flow is undesirable since on the one hand it imposes a load on the electrical and electronic components, and on the other hand it increases the fuel consumption of the vehicle.

During a transmission capability maintaining phase of a frictional shifting element as described above, various measures are provided in known systems to reduce the current demand for operating an electric motor.

For example, in the transmission path between the electric motor and the frictional shifting element, respective gears are provided which are of a self-locking design. Thanks to the self-locking ability of the additional gear system, the transmission capability of the frictional shifting element can be maintained at a desired level with small electric motor actuation currents, and the transmission capability of the frictional shifting element is only changed by higher drive torques of the electric machine.

Disadvantageously, due to the low tooth efficiency in the area of a gear system designed to be self-locking, actuating systems with self-locking require a higher torque from the drive machine over the full operating range of a shifting element than do the actuating systems without self-locking. However, higher actuating forces can only be provided with drive machines of corresponding power. Electric motors with higher power take up more fitting space and are characterized by higher power uptake.

To produce a self-locking actuation system that occupies less fitting space, a transmission ratio between the drive machine and the shifting element can be correspondingly increased, but this compromises the control dynamics to a considerable extent. Furthermore, a usually perpendicular arrangement of a worm gear or screw gearset is a space-saving design.

Alternatively, it is known to provide, in the area of the electric motor or at some other point in the force path of the control system between the electric machine and the frictional clutch, an electromagnetic brake which, in operating phases of the frictional shifting element during which the transmission capability has to be kept substantially constant, in its engaged operating condition prevents a change of the transmission capability of the shifting element. In this way, when the electromagnetic brake is engaged the actuating current of the electric motor can sometimes be reduced considerably.

However, the use of electromagnetic holding brakes entails additional control and regulation complexity and requires corresponding hardware for actuating the electromagnetic brakes, thus increasing the manufacturing and development costs. In addition, when there are frequent demands for changing the operating condition of the frictional shifting element to be actuated, then due to the system-inherent control dynamics of the electromagnetic holding brakes, the holding effect that they provide cannot be used to the desired extent, so the current needed for operating the electric motor cannot be reduced as much as desired.

Associated with electro-mechanically actuated starting clutches of transmission devices are so-termed compensation mechanisms, which assist a control process of frictional clutches and with which the current demand of an electric motor can be reduced inexpensively with little control and regulation effort. The compensation mechanisms usually comprise a spring system prestressed during assembly, which during the actuation of a shifting element acts in the closing direction of the shifting element and gives up its stored spring energy in a path-dependent manner. The support provided by a compensation mechanism acting in the closing direction can be specified as desired by design means and can also be configured as a function of a characteristic force curve that acts in the opening direction in the area of the shifting element to be actuated. For example the compensation mechanism can be designed as a function of the force characteristic of the shifting element in such manner that only a small actuating force has to be provided by the electric motor and the drive converter unit in order to change the transmission capability of the shifting element, whereby the force to be applied by the electric motor only has to bring about an operating condition change in the area of the drive converter unit without additional external force.

Control systems for shifting elements that are made with compensation mechanisms or compensation devices have the advantage, compared with systems having self-locking or an electromagnetic brake, in that a force is already stored during assembly, which opposes the actuating force of the shifting element that acts in the opening direction of the shifting element as a function of the axial actuation path of the shifting element and, depending on the design of the actuating system for the shifting element, the electric motor still essentially has to overcome only a small residual force during the actuation of the shifting element. If the compensation force provided by the compensation mechanism is smaller than the opposing force that occurs during actuation in the area of the shifting element and acts in the opening direction of the shifting element, then when the electric motor is not energized the shifting element changes as required to its open condition. During operation, spring energy that is stored respectively in the area of the compensation device or in the area of the shifting element, which results from component elasticities of the compensation device and of the shifting element, is exchanged between the compensation device and the shifting element.

In each of the known compensation devices, a compensation spring is functionally connected by additional lever elements to a rotary plate, but this entails structural complexity and actuating systems made with such compensation devices also occupy an undesirably larger amount of fitting space.

SUMMARY OF THE INVENTION

Accordingly, the purpose of the present invention is to provide a mechanism for changing the operating condition of a shifting element having two shifting element halves, which can be highly, efficiently operated with little control and regulation effort and which takes up little fitting space.

The mechanism according to the invention for changing an operating condition of a shifting element, in particular a frictional shifting element such as a clutch or brake, with two shifting element halves which can be functionally connected with one another so as to connect at least two components, or disengaged so as to break the connection between the components, comprises a drive machine and a drive converter unit in the area of which rotational drive of the drive machine can be converted into a translational movement of the shifting element. Associated with the drive converter unit is a spring device or compensation device whose spring force assists in actuating a shifting element in its closing direction.

Compared with actuation systems known from the prior art and made with compensation devices, the mechanism according to the invention takes up less structural space since the spring device comprises an at least approximately circular flat spring element which, in a space-saving manner, co-operates with the drive converter unit without additional lever elements in the area of at least one cam with very small power loss and thus high efficiency, along with high control dynamics.

Furthermore, compared with actuating devices that comprise electromagnetic brakes the mechanism according to the invention can be operated with less control and regulation effort, since the spring force of the spring device acting in the closing direction is applied in at least one area of the drive converter unit to at least one cam and the stress condition varies as a function of an operating condition of the drive converter unit, whereby the mode of operation of the spring device, which is based on the functional mode of a compensation device, is obtained during the operation of the shifting element essentially automatically without additional control-side actuation of the spring device or of any further device associated with the spring device or with some other component of the device.

In a particularly space-saving embodiment of the mechanism according to the invention the flat spring element partially surrounds the drive converter unit and the at least one cam is provided in an area of the drive converter unit facing toward an inner side of the flat spring.

In a further embodiment of the mechanism according to the invention characterized by high power density and space-saving configuration, the drive converter unit comprises two frictionally connected devices, one of these devices being designed to rotate and being connected to the drive machine, while the other device is fixed in the axial direction and is also rotationally fixed, and the axial actuating movement for the shifting element can be obtained in the area of the rotating device as a function of the rotation of the rotating device.

In an embodiment of the mechanism according to the invention alternative to that above, the drive converter unit is made with two devices that are functionally connected with each other, one of them being designed to rotate as well as move in the axial direction and being connected to the drive machine, while the other device is fixed both in the axial direction and rotationally, so that axial actuating movement for the shifting element can be obtained in the area of the rotating device as a function of the rotation thereof.

The rotationally fixed design of the flat spring element is independent of the respective kinematics chosen for the devices of the drive converter unit, if the flat spring element is made rotationally fixed relative to the devices, preferably by fixing the flat spring element to the housing.

If the flat spring element is connected in a rotationally fixed manner to one of the devices and the cam is provided in the area of the respective other device, then essentially regardless of the structural particulars of a periphery of the mechanism, the mechanism according to the invention can be made as a preassembled module and can be arranged in the structural space available with a large degree of freedom.

If a closing force to be applied to the shifting element in its closing direction is adapted as a function of a variation of an opening force that acts in the opening direction of the shifting element, produced during an actuation of the shifting element in the area of the shifting element, in such manner that an actuating force produced by the drive machine is preferably at least nearly constant at least within a predefined operating range of the shifting element, the maximum power of the drive machine required for actuating the shifting element can be limited with little effort and the mechanism according to the invention can be made in a space-saving manner.

To provide an actuating force of a size that is as constant as possible over the deformation path of the flat spring element, or to provide, over the full operating range of the mechanism, a uniform spring force from the spring device acting in the closing direction of the shifting element, in further advantageous embodiments of the mechanism according to the invention, a cross-section or shape of the flat spring element is varied in order to produce an at least nearly uniform variation of stress over the circumference of the flat spring element.

For this purpose, a maximum amount power that is available from the drive machine can alternatively or cumulatively be limited in order to regulate the closing force from the flat spring, in that a shape of the cam is adapted as a function of a variation of an opening force acting in the opening direction of the shifting element, produced during actuation of the shifting element, in such manner that an actuating force provided by the drive machine is preferably approximately constant, at least within a predefined operating range of the shifting element.

If the shape of the cam has an assembly section in the area of which the flat spring element can be brought, during assembly, into functional connection with the cam in an operating condition that is essentially free from prestress, then in a simple manner the mechanism according to the invention can be assembled without force and, by then rotating the flat spring element relative to the drive converter unit, it can be brought into contact with another part of the cam's curve geometry and thereby changed to the prestressed condition required for later operation.

In a further advantageous embodiment of the mechanism according to the invention, the shape of the cam is made with a retaining portion in which, in an operating condition of the drive converter unit that is equivalent to an open operating condition of the shifting element, the flat spring element is in contact with the cam and is preferably held against control forces present in the system when the drive machine is switched off.

A further embodiment of the mechanism according to the invention that can be operated with good efficiency is made with a bearing device that is located in the area of the functional connection between the cam and the flat spring element, and by virtue of which frictional forces that occur during operation of the device between the cam and the flat spring element can be reduced simply and inexpensively.

An embodiment of the mechanism according to the invention that can be produced simply and inexpensively is formed with a flat spring element having an essentially cylindrical main body connected to at least two strip elements that extend radially inward from the main body, and in the area of which the bearing device is attached.

An embodiment of the mechanism according to the invention which is force-balanced in the radial direction, is made in the area of the drive converter unit with at least two symmetrically distributed cams, each functionally associated with a respective area of the flat spring element.

If, as a function of the degree of closing of the shifting element, the flat spring element undergoes a varying elliptical deformation, especially an elliptical deformation whose extent increases as the closing degree increases, in a further embodiment of the mechanism the flat spring element is connected in a rotationally fixed manner to one of the devices in areas of lower radial deformation. This considerably reduces any friction force in the area of the rotationally fixed connection between the flat spring element and the device that is rotationally fixed thereto, and minimizes or completely avoids any undesired actuation hysteresis.

Both the characteristics specified in the claims and also those indicated in the example embodiments of the mechanism according to the invention described below, whether considered in isolation or in any desired combination with one another, are appropriate as further developments of the object according to the invention. In relation to such further development of the object of the invention, the respective combinations of characteristics do not represent any limitation, but are presented essentially only as examples.

BRIEF DESCRIPTION OF THE DRAWINGS

Further advantages and advantageous further developments of the invention emerge from the claims and from the example embodiment whose principle is described below with reference to the drawings, which show:

FIG. 1: A schematic representation of an embodiment of the mechanism according to the invention;

FIG. 2: A detailed view of a drive converter unit of the mechanism shown in FIG. 1, with the associated spring device;

FIG. 3: A schematic, three-dimensional detailed view of a flat spring element of the spring device of the mechanism shown in FIG. 1;

FIG. 4: Another simplified view of the flat spring element in FIG. 3, in the essentially stress-free condition;

FIG. 5: A view of the flat spring element corresponding to FIG. 4, but in the prestressed operating condition; and FIG. 6: A number of characteristic force curves produced over the actuation course of the shifting element, starting from the fully open operating condition toward the fully closed operating condition of the shifting element.

DETAILED DESCRIPTION OF THE PREFERRED EMBODIMENTS

FIG. 1 shows a mechanism 1 for changing an operating condition of a shifting element 2, in this case in the form of a frictional clutch, or for actuating the shifting element 2. The shifting element 2 has two shifting element halves 3, 4 which can be functionally connected with one another in order to connect two components 5, 6 or which can be disengaged in order to break the connection between the components 5, 6. In the present case the shifting element 2 or disk clutch is an all-wheel distributor clutch of an all-wheel vehicle drive-train, by means of which, as a function of the transmission capability set in each case, a drive torque provided by a drive motor of the all-wheel distributor transmission can be distributed with varying degrees of distribution between two driven vehicle axles of the all-wheel drive-train. In the fully open operating condition of the shifting element 2, the drive torque of the drive motor is transmitted completely in the direction of one of the driven vehicle axles.

To actuate the shifting element 2, the mechanism 1 comprises a drive machine 7 which in this case is in the form of an electric motor and, arranged between the drive machine 7 and the shifting element 2, a drive converter unit 8 in the area of which a rotary drive motion of the drive machine 7 can be converted into a translational actuating movement of the shifting element 2.

Depending on the application in each case, the drive machine 7 can also be made as a hydraulic motor or the like, which provides the rotary drive needed for actuating the shifting element 2 to the desired extent.

In the present case the drive converter unit 8 comprises two devices 9, 10 that are functionally connected with one another, which are formed as ball-ramp plates and are parts of a ball-ramp system. Between the ball-ramp plates 9 and 10, which in a known way are each made with four ball control surfaces 11, 12, are arranged four ball elements 13 so that a rotational movement of the ball-ramp plate 9 relative to the ball-ramp plate 10, which is fixed both in the axial direction and also rotationally, results in axial displacement of the ball-ramp plate 9. During this, depending on the drive rotation direction imposed in the area of the drive machine 7, the ball-ramp plate 9 either moves in the direction toward the shifting element 2 or away from it.

In the present case the ball-ramp system of the drive converter unit 8 is arranged on a shaft-like component 14, whereby axial forces acting in the area of the devices 9 and 10 are supported against a shaft collar 15. Both between the shaft collar 15 and the device 10 and also between the device 9 and a transfer element 16 that forms the functional connection between the device 9 and the shifting element 2, respective axial bearing devices 17, 18 are provided by means of which, besides absorbing the axial forces, a rotational decoupling between the drive converter unit 8 and the shaft collar 15 and likewise between the drive converter unit 8 and the shifting element 2 is also achieved.

Associated with the drive converter unit 8 is a spring device 19 whose spring force assists an actuation of the shifting element 2 in the closing direction. The spring device 19 comprises an at least approximately circular flat spring element 20 which, as shown in greater detail in FIGS. 2 to 5, comprises an essentially cylindrical main body 21 having four strip elements 21A to 21D connected thereto which are directed radially inward from the main body.

In this case the flat spring element 20 rests, in two areas of the drive converter unit 8 or the device 9, respectively on a cam 22, 23 so that depending on the operating condition of the drive converter unit 8, the stress condition of the flat spring element 20 varies in the manner described later.

As shown in FIGS. 1 and 2 the flat spring element 20 completely embraces the drive converter unit 8 in the area of the device 9, and the cams 22 and 23 are provided in an area of the drive converter unit 8 facing toward an inner side 24 of the flat spring element 20 or an outside of the device 9 facing toward the inner side 24.

By means of the spring device 19, in addition to the actuating force of the drive machine 7, a compensation force acting in the closing direction of the shifting element 2 can be provided, which acts in opposition to a clutch counter-force acting in the opening direction in the area of the shifting element 2. The arrangement of the spring device 19 makes it possible, in the manner shown in more detail in FIG. 6, to minimize and keep the actuating force in the area of the drive machine 7 at least approximately constant over the entire operating range of the shifting element 2.

In the present case, between a motor output shaft 25 of the drive machine 7 and either the drive converter unit 8 or the device 9, there is provided a transmission device 26 in the form of a spur gear stage, by means of which the drive torque supplied by the drive machine 7 is transmitted with an appropriate gear ratio. Besides the spring device 19, the transmission ratio additionally makes it possible to use a lower-powered drive machine.

FIG. 4 shows the flat spring element 20 in a stress-free operating condition in which the flat spring element has an essentially circular basic shape. In this operating condition the flat spring element 20 is in contact, via bearing devices 27, 28 provided between the cylindrical main body 21 in the area of the strips 21A and 21B or 21C and 21D respectively, with the cams 22 and 23 in areas 22A and 23A respectively, this operating condition of the drive converter unit 8 being equivalent to a fully open operating condition of the shifting element 2. In the manner shown in FIG. 1, the bearing devices 27 and 28 are made as radial bearings or radial needle bearings, and can also be made in other applications as slide bearings or ball bearings, by virtue of which during the actuation of the shifting element 2, any sliding friction force occurring due to the rotational movement of the device 9 relative to the flat spring element 20, which is made as a rotationally fixed element, is reduced in a simply designed and inexpensive manner.

In the area of the strips 21B and 21D, the flat spring element 20 is connected to the device 10 in a rotationally fixed manner by means of bolts 29 and 30, which pass through the strips 21B and 21D in each case in the area of a respective slot 21B1 and 21D1. When the drive machine 7 is appropriately energized, the device 9 is rotated relative to the flat spring element 20, whereby the bearing devices 27 and 28 are pushed outward along the contours of the cams 22 and 23 into the radial positions shown in detail in FIG. 2 and the flat spring element 20 is prestressed. During this, starting from its circular shape shown in FIG. 4, the flat spring element 20 undergoes a deformation in the direction of the elliptical shape shown in detail in FIG. 5, from which a corresponding prestress in the flat spring element 20 results.

Since the strips 21B and 21D are made with slots 21B1 and 21D1 respectively, the rotationally fixed connection of the flat spring element 20 to the device 10 by means of the bolts 29 and 30 does not prevent the radial expansion of the flat spring element 20 by the cams 22 and 23, since to the extent of the dimensions of the slots 21B1 and 21D1, the strips 21B and 21D can be displaced relative to the bolts 29 and 30 and the device 10.

To establish a defined spring characteristic of the flat spring element 20, depending on the application concerned or depending on the actuation characteristic of the shifting element 2 during a closing operation condition variation, the flat spring element 20 is made with different material thicknesses, material widths and shapes. For example, even a corrugated design of the flat spring element 20 is a possibility. Both the spring characteristic of the spring device 19 and the shapes of the cams 22, 23 or the design of the cam geometry of the device 9 have to be matched to the degree of assistance and the necessary rotation angle in the area of the drive converter unit 8. In general the flat spring element 20 can be produced inexpensively by deformation methods and the mechanism 1 can be made as a module that can be preassembled.

Otherwise than in the above-described rotationally fixed design of the flat spring element 20 in the area of the likewise rotationally fixed device 10, the flat spring element 20 can also be connected in a rotationally fixed manner to a housing that surrounds the mechanism 1.

Both the starting-point and the variation of the assisting force, that is provided by the spring device 19 and acts in the closing direction of the shifting element 2, can be adjusted by appropriate design of the shapes of the cams 22 and 23. The variation of the assisting force can be made linear, progressive or degressive.

Due to the design of the mechanism 1 with a flat spring element 20 that co-operates with the drive converter unit 8, the mode of operation of the mechanism 1 is not sensitive to tolerance deviations from the circular shape illustrated in the area of the flat spring element 20. Besides the diameter of the flat spring element 20, the spring constant of the spring device 19 is also determined by the thickness and width of the flat spring strip. In relation to a stress distribution over the circumference of the flat spring element 20, the spring device 19 can be optimized by suitable cut-outs in the cylindrical main body 21.

By virtue of the radial movement of the flat spring element 20 during the actuation of the shifting element 2, particularly in the area of the bearing devices 22 and 23 friction forces are produced in the area of rotary support of the flat spring element 20 between the spring elements 21B and 21D and the bolts 29 and 30, which in turn reduce the compensation force provided by the spring device 19 and are also the cause of an undesired hysteresis between an actuation of the shifting element in its opening and its closing directions.

As shown in FIG. 5 the flat spring element 20 has areas 31 to 34 which, during the actuation of the shifting element 2 in its closing direction, essentially do not move radially but only undergo a certain tilting movement in the circumferential direction. If the rotationally fixed connection of the flat spring element 20 is provided in the areas 31 to 34, then rotationally fixing the flat spring element 20 can be realized with reduced frictional forces.

In general the mechanism according to the invention is suitable for actuating shifting elements of any design, such as frictional and/or interlocking shifting elements that can be made as clutches or brakes, so that by virtue of the mechanism 1, energy consumption in the area of a rotary drive such as an electric motor, a hydraulic drive motor or the like can be reduced in a space-saving and simply designed manner thanks to the compensating spring force provided in the area of the spring device.

The basic mode of action provided by the spring device 19 is illustrated simply in FIG. 6 with reference to three characteristic force curves which are plotted over an axial control path against the radial deformation path s (path s shown in FIGS. 3-5) of the transfer element 16 of the flat spring element 20. Starting from a control path equal to zero, the compensation force F20 applied by the spring device 19 to the drive converter unit 8 is essentially equal to zero.

During increased actuation of the shifting element 2 or 16 in the closing direction, the force F2 acting in the opening direction of the shifting element 2 increases. Since due to the design of the spring device 19, the compensation force F20 also increases in the opposite direction, the actuating force F7 to be provided by the drive machine 7 during the increase of the transmission capability of the shifting element 2 remains at least approximately constant, whereby even required holding phases, in which the transmission capability of the shifting element 2 has to be kept constant, can be realized with a small actuating force from the drive machine 7 and thus with a power uptake of the drive machine 7 that only slightly compromises the efficiency.

The spring element can also be mounted on the rotating part of the drive converter unit 8. The cams are then positioned on the counter-part.

INDEXES

1 Mechanism
2 Shifting element
3 Shifting element half
4 Shifting element half
5 Component
6 Component
7 Drive machine
8 Drive converter unit
9 Device, ball-ramp plate
10 Device, ball-ramp plate
11 Ball cam
12 Ball cam
13 Ball element
14 Shaft-like component
15 Shaft collar
16 Transfer element
17 Axial bearing device
18 Axial bearing device
19 Spring device
20 Flat spring element
21 Cylindrical main body
21A to 21D Strip element
21B1 Slot
21D1 Slot
22 Cam
22A Area on the cam
23 Cam
23A Cam
24 Inner side of the flat spring element
25 Motor output shaft
26 Transmission device
27 Bearing device
28 Bearing device
29 Bolt
30 Bolt
31 to 34 Area on the flat spring element
F2 Force characteristic
F7 Force characteristic
F20 Force characteristic
s Deformation path of the flat spring element

The invention claimed is:

1. A mechanism (1) for changing an operating condition of a shifting element (2) with two shifting element halves (3, 4), which are either functionally connectable with one another to connect at least two components (5, 6) or disengaged from one another to break the connection between the two components (5, 6),
    a drive machine (7) connected to a drive converter unit (8) which converts rotary drive motion of the drive machine (7) into translational actuation movement of the shifting element (2),
    a spring device (19) functionally connected with the drive converter unit (8),
    a spring force of the spring device (19) assisting with actuation of the shifting element (2) in an engaging direction,
    the spring device (19) comprising an at least approximately circular flat spring element (20) which is in contact with at least one cam (22, 23) of the drive converter unit, such that a stress condition of the circular flat spring element varies as a function of an operating condition of the drive converter unit (8), the circular flat spring element is rotationally fixed relative to the rotary drive motion of the drive machine.

2. The mechanism according to claim 1, wherein the flat spring element (20) partially surrounds the drive converter unit (8) and the at least one cam (22, 23) is arranged on the drive converter unit (8) so as to face toward an inner side (24) of the flat spring element (20).

3. The mechanism according to claim 1, wherein the drive converter unit comprises first and second devices that are functionally connected with one another, the first device of the drive converter unit is connected to and rotationally driven by the drive machine, the second device of the drive converter unit is displaceable in an axial direction and is rotationally fixed with respect to the first device of the drive converter, and axial actuating movement for the shifting element is produced as a function of rotation of the first device of the drive converter unit.

4. The mechanism according to claim 3, wherein the circular flat spring element is rotationally fixed relative to the first and the second devices of the drive converter unit (8).

5. The mechanism according to claim 3, wherein the flat spring element (20) is connected in a rotationally fixed manner to the second device (10) of the drive converter unit and the cam (22, 23) is arranged on the first device (9) of the drive converter unit (8).

6. The mechanism according to claim 3, wherein as an engaging degree of the shifting element increases, the flat spring element reverts from an elliptical deformation to a round shape, the flat spring element comprises areas which only radially tilt during deformation thereof and are connectable in a rotationally fixed manner to one of the first and the second devices of the drive converter unit.

7. The mechanism according to claim 1, wherein the drive converter unit (8) comprises first and second devices (9, 10) that are functionally connected with each another, the first device (9) of the drive converter unit (8) is connected to and rotationally driven by the drive machine (7) and is movable in an axial direction, while the second device (10) of the drive converter unit (8) is fixed both in the axial direction and rotationally such that an axial actuating movement for the shifting element (2) is produced as a function of rotation of the first rotatable device (9).

8. The mechanism according to claim 1, wherein an engaging force applied by the spring element on the shifting element (2), in an engaging direction of the shifting element (2), is adapted during actuation of the shifting element, based on variation of a disengaging force (F2) acting on the shifting element (2) in a disengaging direction, in such a manner that an actuating force (F7) provided by the drive machine (7) is at least approximately constant, at least within a predefined operating range of the shifting element (2).

9. The mechanism according to claim 1, wherein at least one of a cross-section and a shape of the flat spring element (20) is varied to produce an at least approximately uniform stress variation over a circumference of the flat spring element (20).

10. The mechanism according to claim 1, wherein a shape of the cam (22, 23) during an actuation of the shifting element (2) is adapted as a function of variation of a disengaging force (F2) that acts in a disengaging direction of the shifting element in such manner that an actuating force (F7) provided by the drive machine (7) is at least approximately constant, at least within a predefined operating range of the shifting element (2).

11. The mechanism according to claim 1, wherein a shape of the cam (22, 23) is made with an assembly section, and during assembly, the flat spring element is brought into functional connection with the cam in an operating condition essentially free from prestress.

12. The mechanism according to claim 1, wherein a shape of the cam is made with a retaining area in which the flat spring element contacts the cam in an operating condition of the drive converter unit that is equivalent to an open operating condition of the shifting element.

13. The mechanism according to claim 1, wherein a bearing device (27, 28) functionally connects the cam (22, 23) and the flat spring element (20).

14. The mechanism according to claim 13, wherein the flat spring element (20) has an essentially cylindrical main body (21) which is connected to at least two strip elements (21A to 21D) that are directed radially inward from the main body (21), the bearing device (27, 28) is attached to the at least two strip elements.

15. The mechanism according to claim 1, wherein the drive converter unit (8) has at least one further cam (22, 23), the at least one cam and the at least one further cam are symmetrically distributed about the drive converter unit and functionally connected with the flat spring element (20).

16. A mechanism (1) for changing an operating condition of a shifting element (2), the mechanism comprising:
the shifting element (2) having first and second shifting element halves (3, 4) and which are either functionally connectable with one another to connect at least two components (5, 6) or disengagable from one another to break a connection between the at least two components (5, 6);
a drive machine (7) and a drive converter unit (8), the a drive converter unit (8) converting rotary drive motion of the drive machine (7) into translational actuation movement of the shifting element (2);
a spring device (19) functionally connected with the drive converter unit (8), the spring device (19) having a spring force which is applied on the shifting element (2) for actuating the shifting element (2) in an engaging direction;
the spring device (19) comprising a substantially circular flat spring element (20) which contacts at least one cam (22, 23) to form communication between the spring device and the drive converter unit, a stress condition of the flat spring element (20) varying as a function of an operating condition of the drive converter unit (8) and the flat spring element (20) being rotationally fixed relative to the rotary drive motion of the drive machine.

* * * * *